United States Patent [19]

Yamanaka

[11] 4,043,585
[45] Aug. 23, 1977

[54] BUFFER FOR VEHICLE

[75] Inventor: Akira Yamanaka, Yokohama, Japan

[73] Assignee: Mitsubishi Jidosha Kogyo Kabushiki Kaisha, Tokyo, Japan

[21] Appl. No.: 664,320

[22] Filed: Mar. 5, 1976

[30] Foreign Application Priority Data

Mar. 26, 1975 Japan .................................. 50-41331
Oct. 22, 1975 Japan ................................ 50-127805

[51] Int. Cl.² ............................................. B62D 23/00
[52] U.S. Cl. ................................................ 296/35 R
[58] Field of Search ..................................... 296/35 R

[56] References Cited

U.S. PATENT DOCUMENTS

| 3,321,236 | 5/1967  | Sewelin | 296/35 R |
| 3,479,081 | 11/1969 | Schaaf  | 296/35 R |
| 3,910,624 | 10/1975 | Becker  | 296/35 R |

Primary Examiner—Philip Goodman
Attorney, Agent, or Firm—Oldham & Oldham Co.

[57] ABSTRACT

A buffer for a vehicle comprising a fixing member inserted between a cab or rear body and a chassis frame, and a buffer means held on the member to contact with either of the cab or body or the frame. The fixing member is tilted to deform the buffer means to absorb energy when the cab or body moves relatively to the frame upon collision.

12 Claims, 8 Drawing Figures

BUFFER FOR VEHICLE

BACKGROUND OF THE INVENTION

This invention relates to an improvement of a buffer for vehicle, which is mounted between relatively movable members of the vehicle, for example between a cab or rear body and a chassis frame of motor truck, between a body and a frame of passenger car, or between a cab or coupler head and a frame of trailer truck.

Upon collision in an accident, a cab or rear body mounted on a frame is moved relatively to the frame as by being moved therealong by reaction of an impact force applied to a vehicle body, so that truck crews will be exposed to danger by crash of the cab against another outside object or by the forwardly moving rear body. To minimize the impact force applied to the vehicle, a shock absorber made of an energy absorbing member which is capable of plastic deformation has been mounted between a front bumper and the front end of the frame. However, the shock absorber is not sufficient to absorb the kinetic energy of the rear body due to an extra large inertia energy of the rear body (a cabin in case of a passenger car) created by the reaction of the impact force applied to the vehicle upon collision. Therefore, provision of the shock absorber is not sufficient to secure safety of the crews in the cab. The scheme to provide another appropriate energy absorbing means at the front and rear ends of the vehicle in addition to said shock absorber requires a fairly large size of the energy absorbing means and large spaces for mounting the means at the front and rear ends of the vehicle, which result in an increase of the size and gross weight of the vehicle and the manufacturing cost accordingly.

SUMMARY OF THE INVENTION

In order to overcome the shortcoming of the conventional device, this invention is to provide a buffer for a vehicle, comprising a fixing or attaching member inserted through holes provided in a cab or rear body and a chassis frame of the vehicle, and a buffer means held on said fixing member and contacting with at least either of said cab or rear body or said chassis frame, said fixing member being formed to fit loosely into at least one of said holes, said fixing member and said buffer means normally preventing relative movement between said cab or rear body and said chassis frame, said fixing member being tilted to cause said buffer means to be deformed to absorb energy when said cab or rear body is moved relative to said chassis frame by an impact force of more than a predetermined value applied to the vehicle.

DESCRIPTION OF THE PREFERRED EMBODIMENTS

Figure 1:
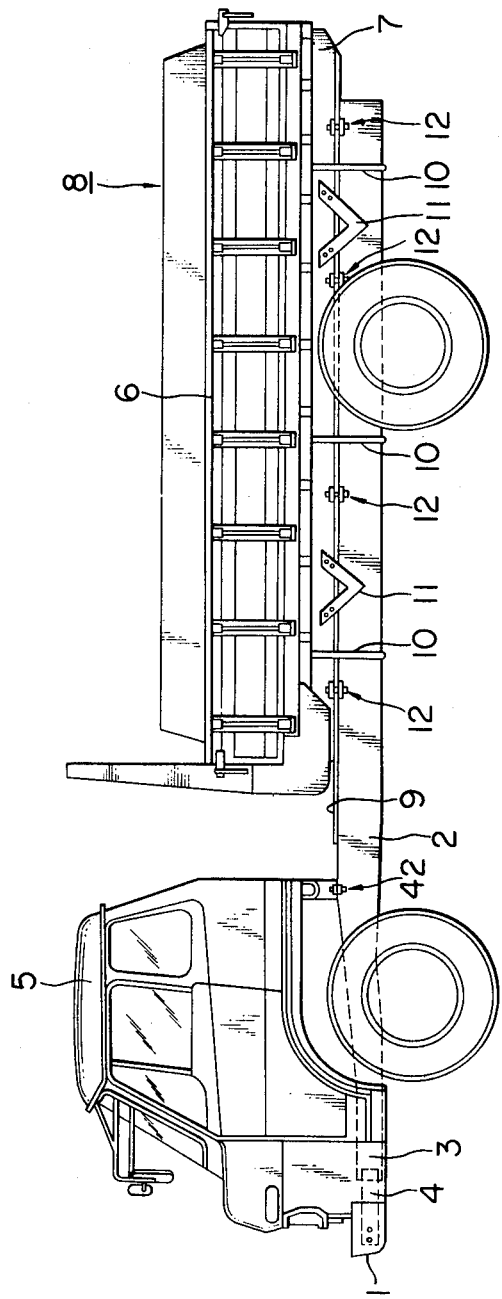
FIG. 1 shows a schematic side view of a motor truck having buffers according to the invention.

In FIG. 1, a motor truck includes a shock absorber 4 which is a known energy absorbing member mounted between a front bumper 1 and a front end 3 of a chassis frame 2, a driver's cab 5 mounted on the forward portion of the frame 2 and a rear body 8 which is mounted on the frame 2 behind the cab 5 and consists of a body 6 and a bolster 7. A friction plate 9 is provided between the bolster 7 and the frame 2. The friction plate is made of a material having a large coefficient of friction, for example, a friction plate used as a brake pad for a frictional brake. The bolster 7, the friction plate 9 and the frame 2 are integrally joined by means of U-bolts 10 and V-shaped fixing members 11 under normal condition. A plurality of buffers 12, of which details are described below, are provided between the frame 2 and the bolster 7.

Figure 2:
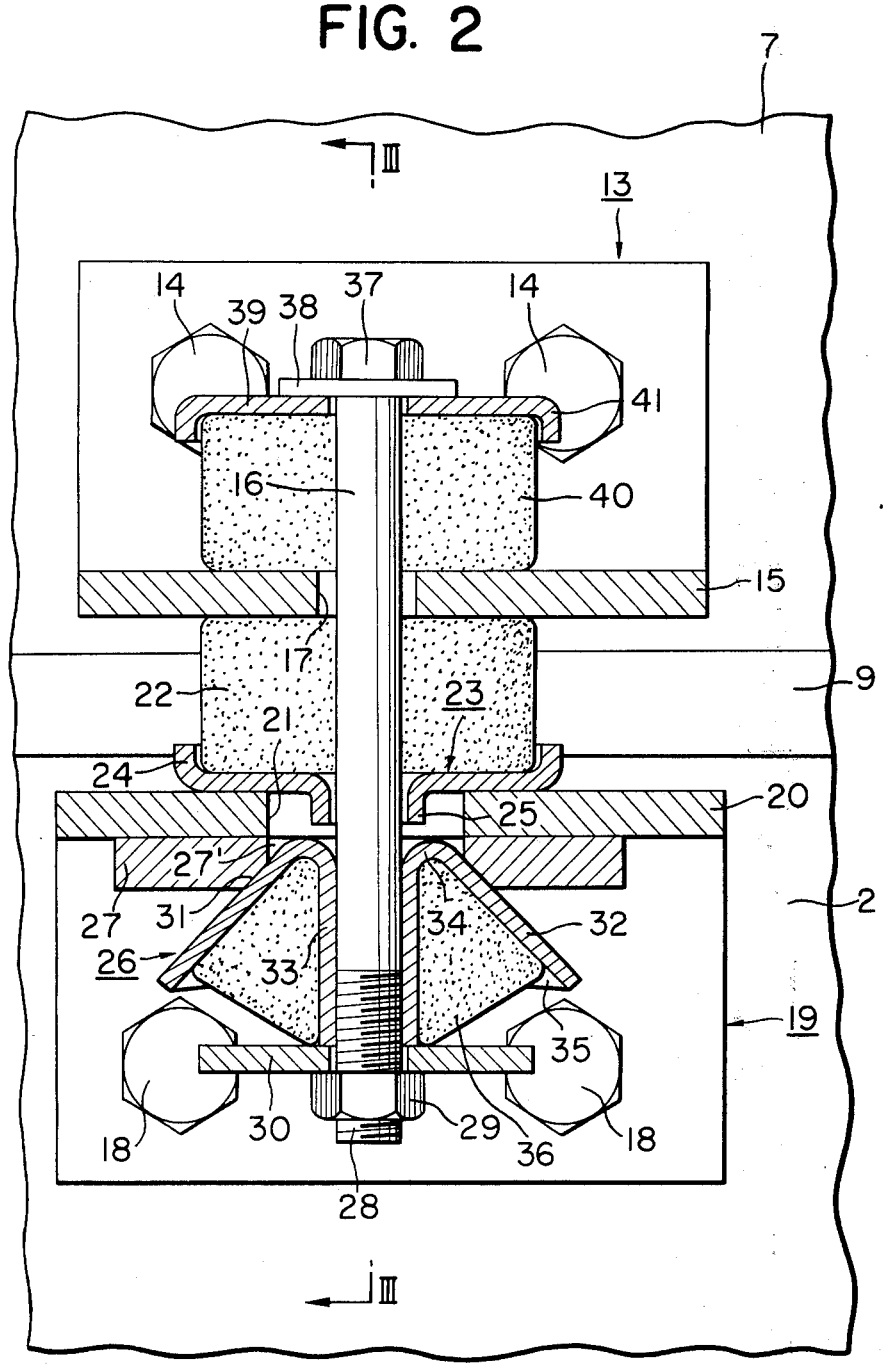
FIG. 2 shows an enlarged sectional view of a first embodiment of the buffer in FIG. 1.
Figure 3:
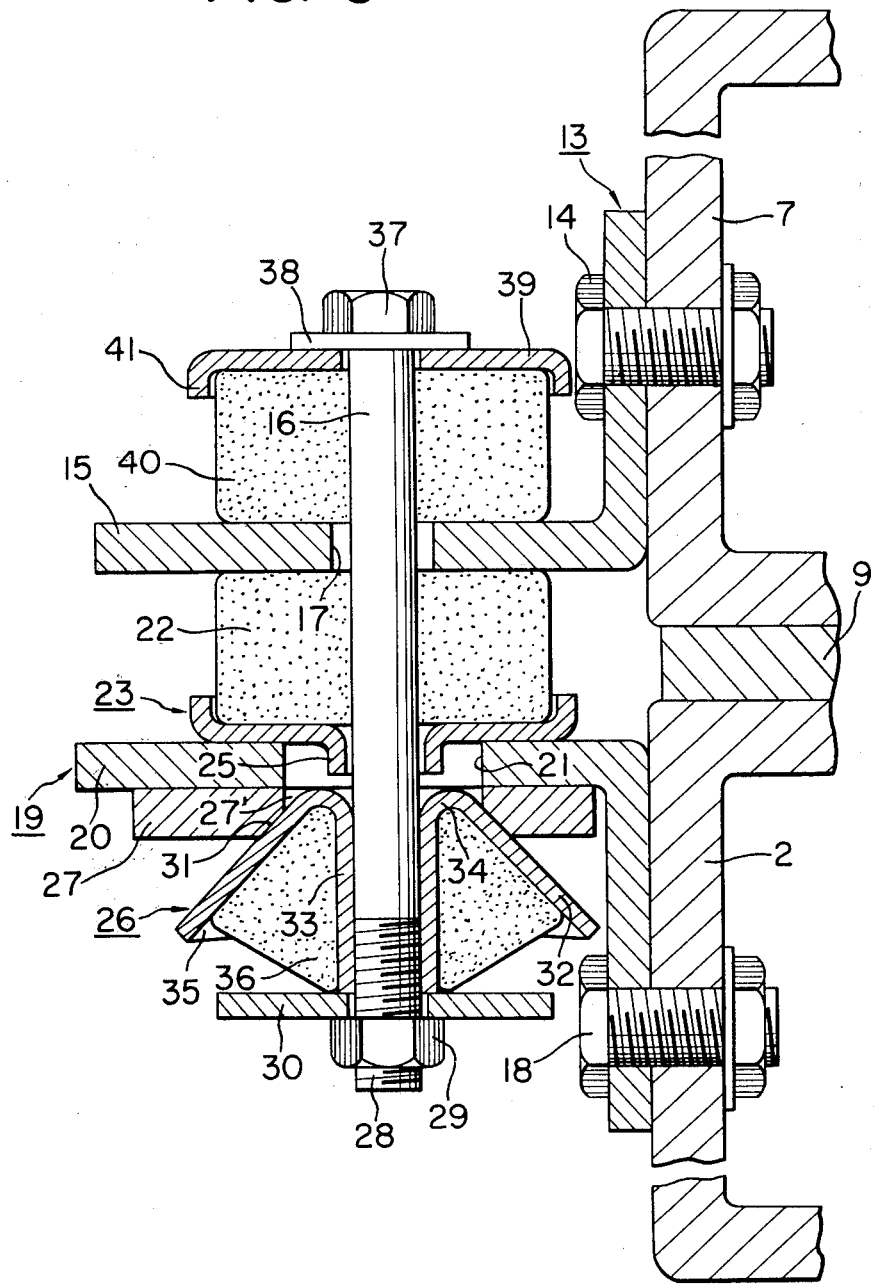
FIG. 3 shows a cross-sectional view taken along the line III—III in FIG. 2.

A first embodiment of the buffer 12 according to this invention is shown in FIGS. 2 and 3. The buffer 12 includes a first bracket 13 fixed to the outside of the bolster 7 by two fixing bolts 14 or by welding. A first flange hole 17 is provided in a first flange portion 15 of the first bracket 13 for insertion of a bolt 16 through the hole, constituting a fixing member. An inner diameter of the hole 17 is larger than an outer diameter of the bolt 16. Similarly, a second bracket 19 of the buffer is fixed to the frame 2 by means of two fixing bolts 18. A second flange hole 21, of which diameter is larger than the inner diameter of said first flange hole 17, is provided in a second flange portion 20 of the second bracket 19 at a position where said hole 21 substantially aligns with the hole 17. A first buffer member 22 made of plastic or foamed material is held between the first flange portion 15 and a first retainer 23 mounted on the second flange portion 20, allowing the bolt 16 to extend through the member. The first retainer 23 is formed with a flange 24 which holds the buffer member 22 and a guide flange 25 which enables the first retainer 23 to make relative displacement smoothly along the axial direction of the bolt 16. The guide flange 25 is fitted into the second flange hole 21. A plastically deformable second buffer member 26 is placed between a die 27, which is secured to the lower surface of the second flange plate 20 by any suitable means such as welding or bolts (not shown), and a second retainer 30 located on the upper surface of a nut 29 screwed into a thread part 28 of the bolt 16. The second buffer member 26 has a conical portion 32 which is formed to fit into a tapered hole portion 31 being a part of a die hole 27' of the die 27, and a vertically extending sleeve portion 33 which enables said second buffer member 26 to integrally move with the bolt 16 in accordance with tilting displacement of the bolt 16. An upwardly projecting convex portion 34 is formed at a connection between said portions 32 and 33 fitted into the die hole 27'. A space 35 surrounded and defined by the conical portion 32 and the sleeve portion 33 contains a third buffer member 36 made of the same material as said first buffer member 22. The second retainer 30 of a flat plate shape is held between the bottom end of the sleeve portion 33 and the nut 29. A fourth buffer member 40 made of for example hard rubber or synthetic resin is held between a third retainer 39 contacting with a washer 38 placed at the bottom part of a bolt head 37 and the first flange portion 15. A flange 41 which is formed by a downwardly bent peripheral edge of the third retainer 39 surrounds the upper periphery of the fourth buffer member 40. Thus, in the above described first embodiment shown in FIGS. 2 and 3, the bolt 16 and the nut 29 which form a core bar member are inserted into the first and second flange holes 17 and 21 through the first, second, third and fourth buffer members 22, 26, 36 and 40 and fixed to the bolster 7 and the frame 2, so that said buffer members are normally held by the first and second brackets 13 and 19 and especially the conical portion 32 of the second buffer member 26 is preferably engaged in contact or pressed into contact with the tapered hole portion 31 of the die 27.

Figure 4:
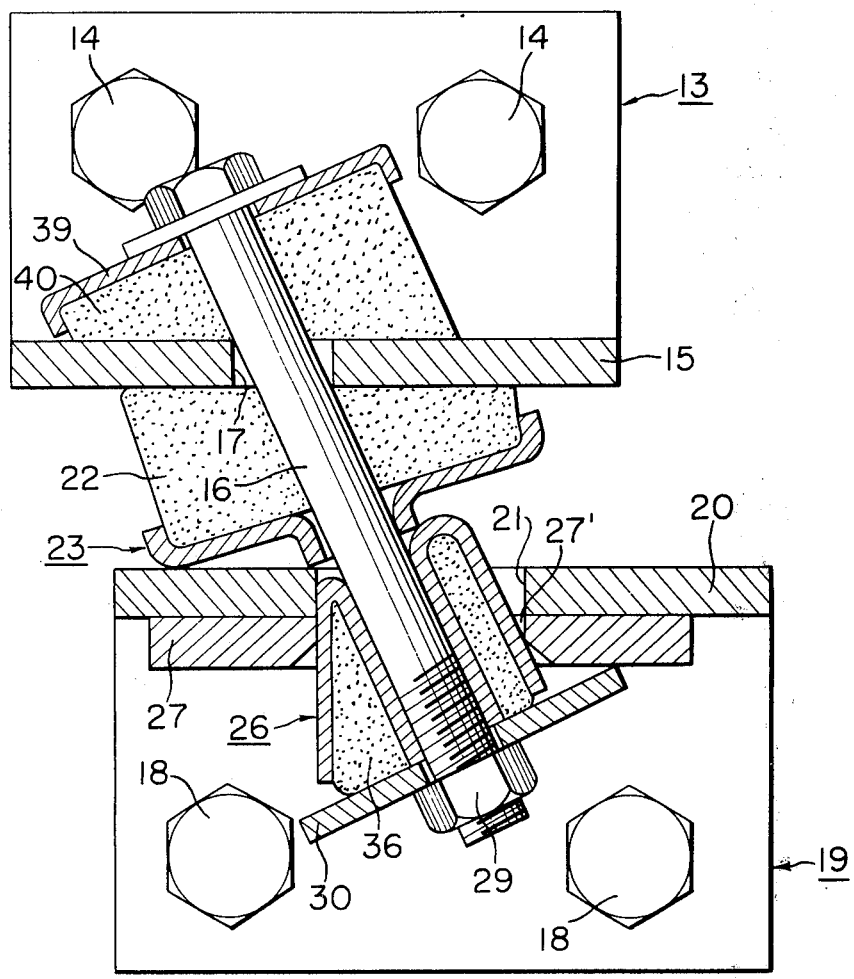
FIG. 4 shows an explanatory view of the function in the first embodiment.

As said first embodiment is constructed as described above, when a collision of the truck, for example a head-on collision, occurs against the outside object, the shock absorber 4 mounted between the bumper 1 and the frame front end 3 effects to absorb a part of kinetic energy of the vehicle created by the collision. On this occasion of the vehicle collision, when inertia force of the rear body 8 exceeds a predetermined value, the fixing members 11 get broken off or deformed. Then, the rear body 8 moves to the left in FIGS. 1 and 2 while it is in face contact with the friction plate 9 or the frame 2. The bolt 16 is forced to rotate counter-clockwise in FIG. 2 and tilted into a condition as shown in FIG. 4. Namely, the bolt 16 is tilted within the limit set by the inner diameter of the first flange hole 17, and the fourth buffer member 40 is compressed and deformed between the third retainer 39 and the first flange portion 15 in a manner that an amount of deformation is larger at the left side than at the right side. Also, the first retainer 23 is tilted integrally with the bolt 16 to lift the right side portion of the first retainer 23 away from the second flange portion 20, whereby the first buffer member 22 is compressed and deformed between the first flange portion 15 and the tilted first retainer 23. Further, as the relative distance between said first flange hole 17 and the second flange hole 21 becomes larger, the second retainer 30 is also tilted integrally with the bolt 16, so that the conical portion 32 of the second buffer member 26 is pressed into and pulled through the die hole 27'. Accordingly, the amount of plastic deformation of the second buffer member 26 is larger at the right side than at the left side. At the same time, the third buffer member 36 is compressed and deformed while being constrained by the second buffer member 26 and the second retainer 30. Thus, the kinetic energy possessed by the rear body 8 can be absorbed and the inertia force thereof can be reduced by the effects of compressed deformation of the first, third and fourth buffer member 22, 36 and 40 and of plastic deformation of the second buffer member 26.

Although the head-on collision by which the rear body 8 makes relative displacement towards the front of the vehicle was explained hetherto, it is needless to say that said buffer 12 works smoothly at any angle of relative displacement of the rear body 8 such as oblique displacement towards the front or the lateral displacement of the rear body 8 on the frame 2.

Thus, according to the first embodiment described above, not only the kinetic energy of the rear body 8 is effectively absorbed by a plurality of the buffers 12 consisting of four buffer members 22, 26, 36 and 40 which are mounted around the bolt 16 and the nut 29 which fix the rear body 8 to the frame 2, but also the vibration of the rear body 8 or the frame 2, which is caused by running of the vehicle when the vehicle is normally operated, can be absorbed. Also, there is an advantage that a dimensional error between the rear body 8 and the frame 2 can be easily compensated upon mounting the rear body onto the frame even when the deformation of the rear body or the frame and the manufacturing error produced through manufacturing of the rear body 8 or the frame 12 exist, since the inner diameters of the first and second flange holes 17 and 21 are relatively larger than the outer diameter of the bolt 16. Furthermore, by providing this type of compact buffers 12 between the rear body and the frame, sufficient safety of the crews can be obtained and a large space required for mounting the buffers in the vehicle is unnecessary.

Though, in the above mentioned first embodiment, the buffers are provided between the rear body and the frame of the truck, a buffer 42 may be provided between the cab 5 and the frame as shown in FIG. 1. In a passenger car, by providing said buffers (not shown) between the cabin or body and the frame of the car, the front hood of the car, which is currently made longer intentionally to ensure the extra portion prepared for the crash upon collision, can be made shorter, so that the interior space of the body can be made larger.

Figure 5:
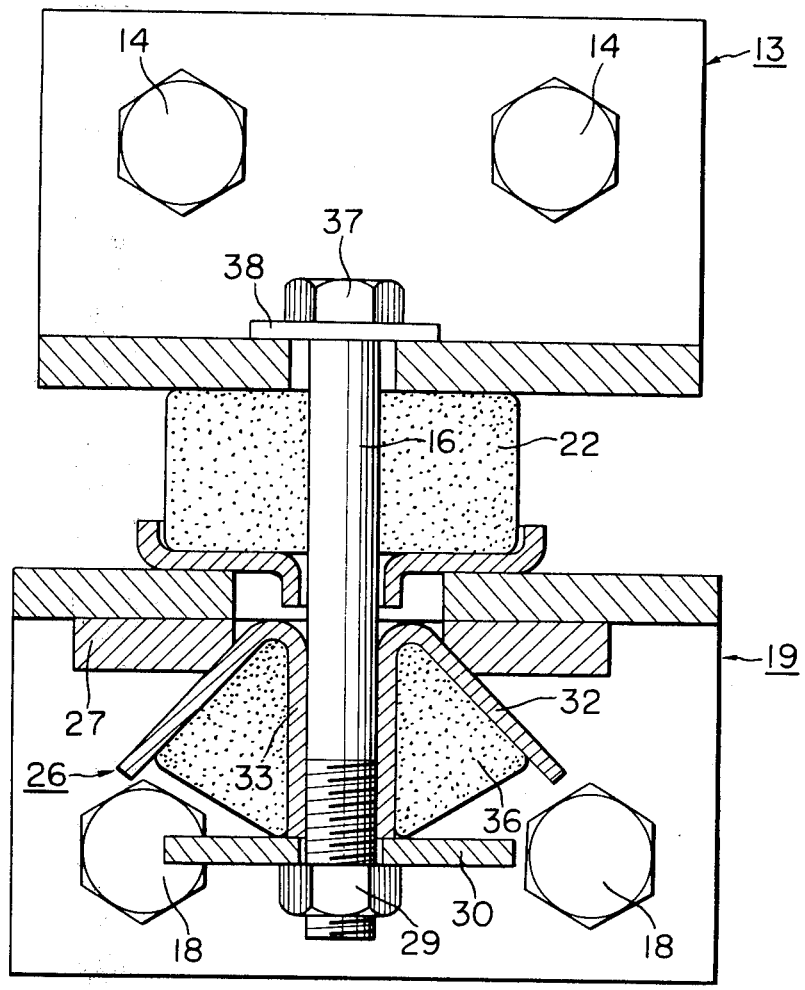
FIG. 5 shows a cross-sectional view of a second embodiment of the buffer similar to FIG. 2, but without showing the bolster, the friction plate and the frame.

In the second embodiment of the buffer as shown in FIG. 5, only the difference from the first embodiment is an omission of the fourth buffer member 40, and its other construction and operational effect are substantially same as in the first embodiment.

Figure 6:
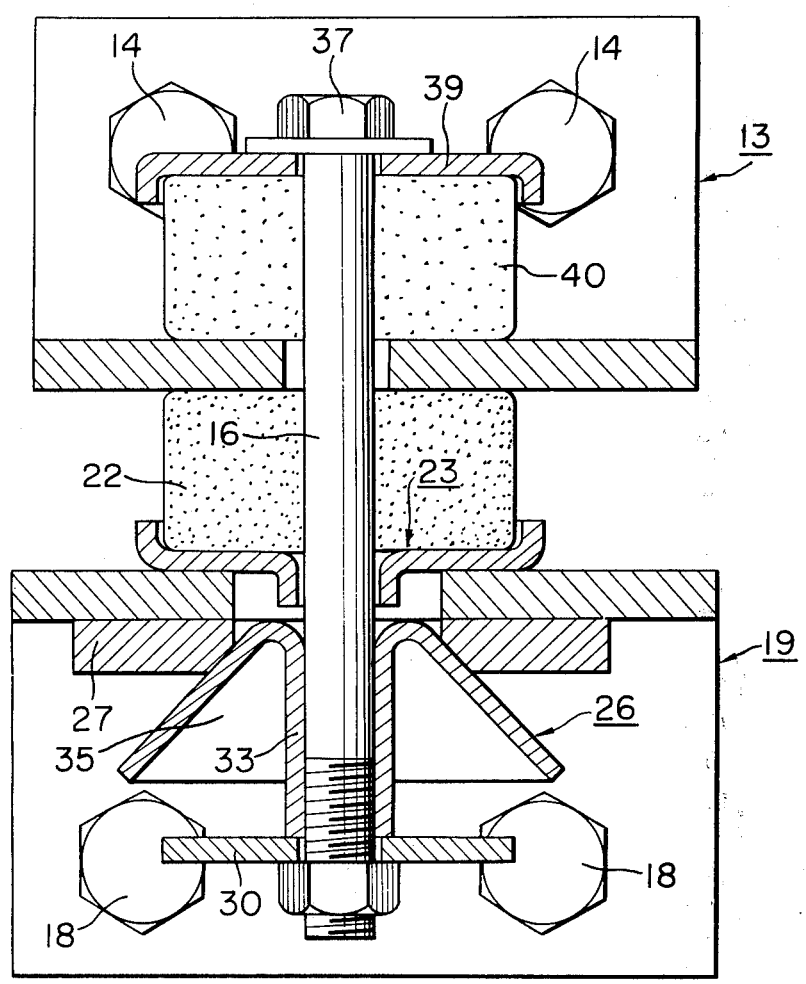
FIG. 6 shows a cross-sectional view of a third embodiment of the buffer similar to FIG. 5.

The third embodiment shown in FIG. 6 differs from the first embodiment in a point that said third buffer member 36 is not provided, and other construction and operational effect are substantially same as in the first embodiment.

Figure 7:
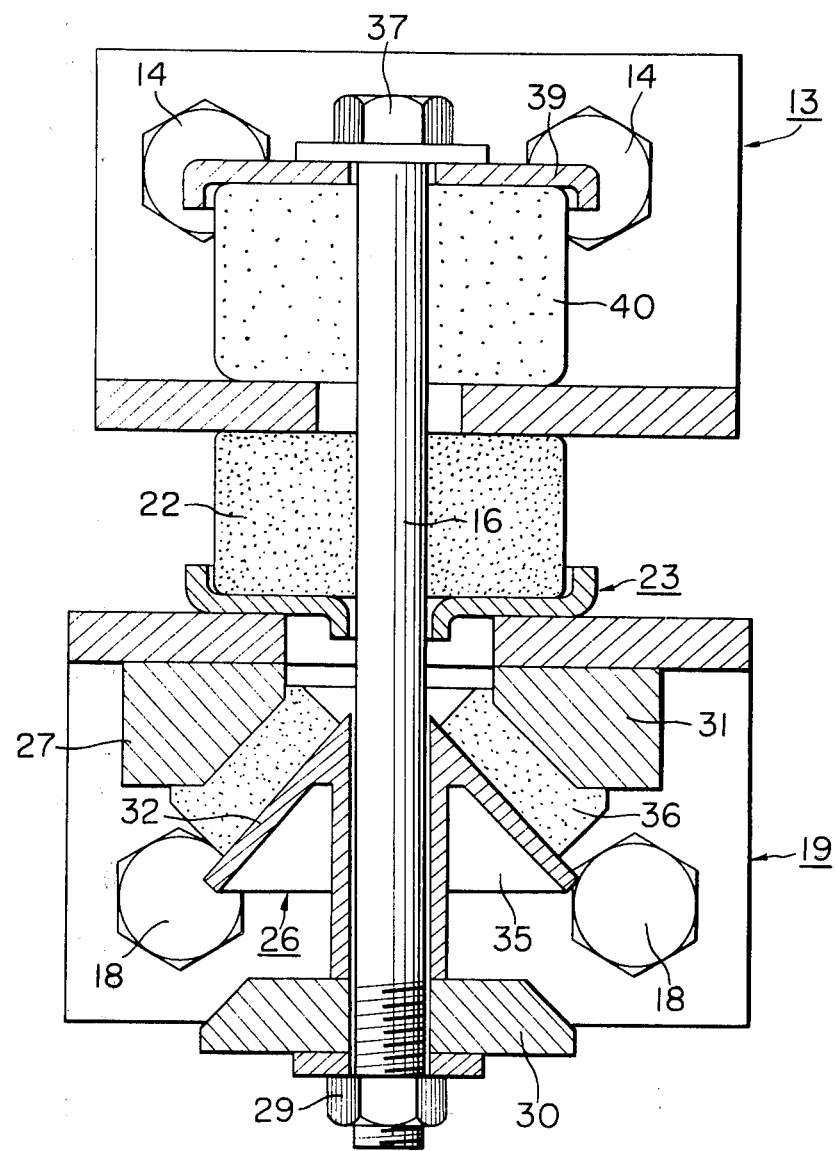
FIG. 7 shows a cross-sectional view of a fourth embodiment of the buffer.
Figure 8:
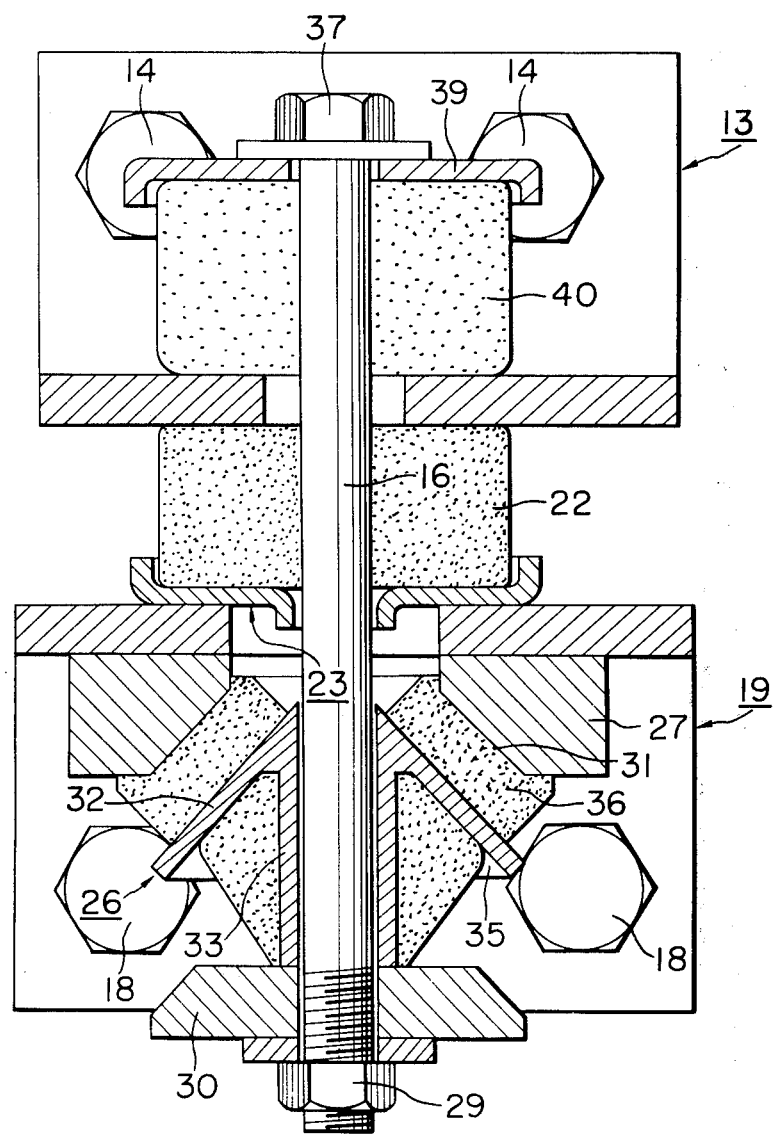
FIG. 8 shows a cross-sectional view of a fifth embodiment of the buffer.

In the fourth embodiment shown in FIG. 7, a difference in its construction from the first embodiment is that the third buffer member 36 is provided between the tapered hole portion 31 of the die 27 and the conical portion 32 of the second buffer member 26, whereas in the first embodiment the third buffer member 36 is provided in the space 35 in the second buffer member 26. It will be seen that other construction and operational effect are substantially same as those in the above mentioned first embodiment. Another buffer member may be provided in the space 35 defined by the conical portion 32 and the sleeve portion 33, in addition to the buffer member 36 provided in a space between the conical portion 32 and the tapered hole portion 31, as shown in FIG. 8.

The first, third and fourth buffer members are simply made of rubber in the above mentioned embodiments, but they may be made of metal material with a honeycomb construction in its inside or rubber with the same construction. Also, instead of the conical portion 32 of the second buffer member 26, a quadrangular pyramid or any suitable pyramid may be used.

What is claimed is:

1. A buffer for normally preventing relative movement between a cab or body and a chassis frame of a vehicle, comprising a fixing member inserted through holes provided in flange portions of a first bracket fixed to said cab or rear body and of a second bracket fixed to said chassis frame, said fixing member being formed to fit loosely into at least one of said holes so as to tilt upon said relative movement, a buffer means being held on said fixing member and including a first buffer member provided between said flange portions of said first and second brackets and a second buffer member provided between one of said flange portions and either of a nut or a head of a bolt forming said fixing member, said first and second buffer members being passed through by said bolt, and a die having a die hole therein operatively positioned adjacent one of said buffer members, said first buffer member being made of resilient material, said second buffer member being plastically deformable and positioned adjacent said die hole to be pulled into the same upon the relative movement between said cab or body and said chassis frame by an impact force of more than a predetermined value applied to the vehicle.

2. A buffer for a vehicle, comprising a fixing member consisting of a bolt and a nut inserted through holes provided in a cab or body and a chassis frame of the vehicle, and a buffer means held on said fixing member and contacting with at least either of said cab or body or said chassis frame, said fixing member being formed to fit loosely into at least one of said holes, said fixing member and said buffer means normally preventing relative movement between said cab or body and said chassis frame, said fixing member being tilted to cause said buffer means to be deformed to absorb energy when said cab or body is moved relative to said chassis frame by an impact force of more than a predetermined value applied to the vehicle; said holes being provided in flange portions of a first bracket fixed to said cab or body and a second bracket fixed to said chassis frame respectively; said buffer means including a first buffer member provided between said flange portions of said first and second brackets, and a second buffer member provided between one of said flange portions and either of said nut or a head of said bolt, said bolt extending through said first and second buffer members; and a first retainer for holding said first buffer member is placed in contact with one of said flange portions, and a second retainer for holding said second buffer member abuts on said nut or said bolt head.

3. A buffer according to claim 2 wherein said second buffer member is plastically deformable and adapted to be pulled through a die hole of a die provided on said one flange portion.

4. A buffer according to claim 3 wherein said second buffer member has a conical metal portion adapted to fit into said die hole to be pulled therethrough to absorb energy.

5. A buffer according to claim 1, wherein said second buffer member has a portion formed to fit into said die hole and adapted to be plastically deformed, and a sleeve portion allowing said bolt to extend through the second buffer member.

6. A buffer according to claim 5, wherein said portion formed to fit into the die hole is conical shaped.

7. A buffer according to claim 5, wherein a third buffer member is provided in a space defined by said portion formed to fit into the die hole and said sleeve portion.

8. A buffer according to claim 7, wherein a fourth buffer member is provided between either of said bolt head or said nut and the other of said flange portions.

9. A buffer according to claim 8, wherein said fourth buffer member is made of resilient material and has a hole for allowing the passage of the bolt.

10. A buffer according to claim 2, wherein a third retainer is provided between a fourth buffer member and either of said bolt head or said nut.

11. A buffer according to claim 5, wherein a third buffer member is provided between said portion formed to fit into the die hole and said die.

12. A buffer according to claim 11, wherein another buffer member is provided in a space defined by said portion formed to fit into the die hole and said sleeve portion.

* * * * *